3,806,561
INSECTICIDAL COMPOSITION CONTAINING DI-
METHYL DICHLOROVINYL PHOSPHATE AND
ISOSTEARIC ACID
Charles Zviak, Franconville, and Jean Daeninckx, Saint-
Denis, France, assignors to L'Oreal, Paris, France
No Drawing. Filed Feb. 22, 1971, Ser. No. 117,800
Claims priority, application Luxembourg, Feb. 25, 1970,
60,414/70
Int. Cl. C07f 9/08; A01n 9/36
U.S. Cl. 260—957                                  3 Claims

ABSTRACT OF THE DISCLOSURE

An insecticidal composition comprises a homogeneous solution of dimethyl dichlorovinyl phosphate and isostearic acid present in amounts sufficient to stabilize and to control the evaporation rate of the dimethyl dichlorovinyl phosphate. Absorbent supports can be impregnated with this insecticidal composition.

---

This invention relates to a novel insecticide composition and, more particularly, to an insecticidal composition comprising a homogeneous solution of dimethyl dichlorovinyl phosphate and isostearic acid present in amounts effective to stabilize said dimethyl dichlorovinyl phosphate and to control or retard the rate of evaporation thereof.

The insecticidal properties of compounds such as vinyl dialkylphosphates, their halogen addition products and vinyl dialkylphosphorothioates are well known. Of these compounds, the one most often used at the present is dimethyl dichlorovinyl phosphate, commonly designated by the abbreviation DDVP. This compound functions by releasing its vapors by evaporation, which vapors are toxic to insects. The extent of the zone of toxic vapors depends particularly on the amount of vapor emitted by DDVP, which in turn is dependent on the surface area of the DDVP exposed to the atmosphere.

DDVP is considered a relatively unstable compound and in the presence of water, water vapor or traces of heavy metals, for example, it has a tendency to decompose partially into secondary chloro products which have a rather strong odor.

This degradation entails a rapid loss of the insecticidal activity of DDVP and is, as indicated above, particularly notable when the atmosphere is heavily charged with water vapor.

Consequently, the effectiveness of a DDVP-based insecticide composition depends directly on the conditions under which this compound evaporates into the atmosphere.

To increase the evaporation surface of DDVP it has heretofore been proposed to impregnate an absorbent material such as a powder or a fabric with DDVP in liquid form. However, the results have not been totally satisfactory because the insecticidal effect has been noted to rapidly cease or diminish because of rapid evaporation of the DDVP. Further, this rapid evaporation creates a further disadvantage in that the zone in the vicinity of the evaporation surfaces exhibits too high a DDVP content, which is considered either bothersome or dangerous.

In an attempt to remedy these various disadvantages, it has also been proposed to introduce DDVP as a plasticizer in a small slab of polyvinyl chloride, prepared under special conditions, to permit the DDVP to migrate slowly toward the surface of the slab where it progressively evaporates into the atmosphere.

While these efforts make it possible to limit, to a certain extent, a too rapid evaporation of DDVP, and thereby, prolong its action, this form of the insecticide nevertheless presents a major disadvantage in that at the end of use there is generally always a considerable amount of DDVP remaining in the slab, which is then thrown out while it is still emitting toxic fumes.

It has also been proposed to use DDVP in combination with animal or vegetable oils and fats in an effort to retard or delay its rate of evaporation and to inhibit or reduce its decomposition.

The oils generally used are cottonseed oil, linseed oil or sunflower seed oil. These oils are siccative or semi-siccative oils, so that upon drying they imprison the DDVP. Consequently, there is a resulting reduction of the insecticidal activity and, moreover, the drying characteristics of the oils, which is a direct result of oxidation, involves degradation of the DDVP.

It is therefore a general object of the present invention to overcome the disadvantages of prior art insecticidal compositions based on DDVP by providing a novel composition which is easy to use and which offers effective and lasting protection against insects.

More particularly, the present invention has for an object, the provision of a novel industrial product which is a novel insecticidal composition which is stable and which exhibits a prolonged period of insecticidal activity, said composition comprising a homogeneous solution of dimethyl dichlorovinyl phosphate (DDVP) and isostearic acid present in amounts effective to stabilize the DDVP and to control, i.e. reduce its rate of evaporation.

As is known, isostearic acid is a saturated fatty acid, with the empirical formula $C_{17}H_{35}COOH$, an isomer of stearic acid. In contrast with stearic acid, which is a natural fatty acid, isostearic acid can be obtained only synthetically.

Isostearic acid, in relation to its isomer, stearic acid, has the advantage of being liquid at ambient temperature. Actually stearic acid is solid at regular temperature since it has a melting point which is around 70–72° C.

Numerous tests conducted by the applicants have made it possible to illustrate in a quite surprising way that isostearic acid functions as an excellent stabilizer for DDVP, thus substantially or significantly preventing its degradation, thereby considerably prolonging the period of its insecticidal effectiveness.

Isostearic acid exhibits exceptional stability with regard to oxidation by air and this stability to oxidation is significantly superior to that of natural fatty acids.

Since DDVP is sensitive to oxidation by air, isostearic acid used in accordance with the present invention makes it possible to reduce or inhibit its degradation considerably.

According to the present invention, the amount of DDVP included in the homogeneous solution generally ranges between 1 and 99 weight percent and preferably, between 30–70 weight percent.

Generally, the insecticidal effect of a composition having a DDVP concentration between 30 and 70% has been observed to continue for more than 3 months when used in a room having a volume in the order of 30 cubic meters.

However, it is possible to employ an insecticidal composition having a DDVP concentration less than about 30%, especially when it is desired to obtain an insecticidal effect that is shorter or when it is desired to eliminate insects in a room having a volume less than about 30 cubic meters. In this latter case, even with a DDVP concentration less than about 30%, the insecticidal activity can continue beyond 3 months.

It should be pointed out that the use of a high DDVP concentration may run the risk of causing too high a release of DDVP vapors in the immediate vicinity of the insecticidal composition, but such compositions can be used with advantage if the insecticidal composition is employed in an area that is sufficiently well ventilated.

As a variation of the present invention, a part of the isostearic acid content of the insecticidal composition can be replaced by a mineral oil that is liquid at ambient temperature. By "mineral oil that is liquid at ambient temperature" is meant oils obtained by distillation of petroleum whose initial distillation point is between 200° C. under atmospheric pressure and 400° C. under 6 mm. of mercury.

Representative mineral oils that can be used are, for example, mineral oil sold under the tradename "Primol 342" by Esso and having an initial distillation point under 10 mm. of mercury of 230° C., and a mineral oil sold under the trade name "250 T" also by Esso, having an initial distillation point of 279° C. under atmospheric pressure.

Additional commercially available mineral oils usefully employed in the present invention include a mineral oil sold under the trade name "$H_2N$–25" by Geeraert and Matisse, said oil having an initial distillation point of 280° C. under 760 mm. of Hg, a viscosity of 0.4 poise and a density of 0.749; a mineral oil sold under the trade name "Bayol 80" by Esso having an initial distillation point of 280° C. under 760 mm. of Hg, a viscosity of 0.4 poise and a density of 0.749; and a mineral oil sold under the trade name "Marcol 80" by Esso, having an initial distillation point of 160° C. under 6 mm. of Hg, an Engler viscosity of 4.3 at 20° C. and an acid index below 1. These mineral oils which are liquid at ambient temperature, can be used in the insecticidal composition of the present invention and all have the characteristic of being extremely water repellent, thereby providing better protection of the DDVP against hydrolysis due to water vapor in the air. Further, these mineral oils, like isostearic acid, effectively function as an evaporation retardant for DDVP.

Since DDVP is not miscible with mineral oils, it is imperative that the amount of mineral oil present in the composition be such that the homogeneity, an essential characteristic of the composition be preserved.

Because the operable concentration range of DDVP in the insecticidal composition according to the present invention is extensive, those skilled in the art can, of course, easily determine, for any given or selected DDVP concentration, those effective and useable concentrations of mineral oil which preserve the homogeneity of the resulting solution.

Further, the mineral oil concentration of the insecticidal compositions according to the present invention can also depend on another easily ascertainable factor by those skilled in the art. This factor involves the type of mineral oil used. It has been found, for instance, that for a given concentration of DDVP, homogeneous solutions are possible with different concentrations of different mineral oils.

Thus, in the case of insecticidal compositions containing 50% DDVP, homogeneous solutions can be prepared by using up to 32% of a mineral oil sold under the trade name "250 T" and by using 25% of a mineral oil sold under the trade name "Primol 342," the remainder being isostearic acid.

According to a variant of the present invention, the effectiveness of the insecticidal composition can be increased by incorporating therein other insecticides such as, for example, polychloroterpene based insecticides. These latter are generally known as contact insecticides. Representative of such insecticides is one sold under the trade name "Strobane" (a terpene polychlorinate with a chlorine content of approximately 66 percent).

The present invention also has for an object the provision of an insecticidal slab comprising an absorbent support impregnated with the insecticidal composition of the present invention.

According to the present invention, a great variety of materials can be used as the absorbent support. Representative of such materials are felts and fabrics made from, for instance, asbestos and cotton, the support being provided in any desired size or geometric shape since neither the shape nor the size constitutes an essential characteristic of the present invention. The absorbent support used in the present invention essentially has the purpose of maintaining by absorption and, possibly, by adsorption the insecticidal composition of the invention.

The absorbent support is generally impregnated with about 1 to 5 times and preferably 2 to 4 times its own weight of the insecticidal composition according to the invention.

Tests performed by the applicants have shown that slabs impregnated with the homogeneous insecticidal composition of the invention can be kept for several months in an oven containing air at 40° C. without producing the characteristic odors of chloro products, a general indication of an advanced DDVP decomposition.

Other tests performed have shown that slabs impregnated with the insecticidal composition according to the invention, retain their insecticidal power for at least 3 to 4 months.

These tests show that the presence of isostearic acid or mixture of isostearic acid and mineral oil, which is liquid at ambient temperature, plays a double role:

(1) it acts as a DDVP evaporation retardant, thereby extending the effective life of the latter;
(2) it acts as a DDVP stabilizer, particularly when this insecticide is in an environment where the humidity is very high.

For a better understanding of the invention, the following examples are provided.

EXAMPLE 1

An absorbent slab made of asbestos and unoriented cotton, in parallelepipedic form, and having a surface of 150 cm.$^2$ and a weight of 10 g. is impregnated with 30 g. of the following homogeneous mixture:

|  | G. |
|---|---|
| DDVP | 50 |
| Isostearic acid | 50 |

The resulting slab is placed in a room of about 30 m.$^3$, and exhibits effective insecticidal power for a period generally greater than 3 months.

EXAMPLE 2

An absorbent felt support, weighing 12 g. and having a surface of 200 cm.$^2$, is impregnated with 60 g. of the following homogeneous mixture:

|  | G. |
|---|---|
| DDVP | 40 |
| Isostearic acid | 60 |

This slab provided excellent environmental insecticidal activity for a period of about 3 months.

EXAMPLE 3

An absorbent slab, made of asbestos and oriented cotton, in parallelepipedic form, having a surface of 50 cm.$^2$ and a weight of 3.5 g. is impregnated with 12 g. of the following homogeneous mixture:

| | G. |
|---|---|
| DDVP | 48 |
| Isostearic acid sold by the Emery Company under the trade name of "Isostearic Acid 3.101D" | 52 |

The slab thus formed is provided with a protective screen and closed on one of its faces by an adhesive vellum paper to insure slower evaporation of the DDVP. The slab provided excellent moth insecticidal activity in cupboards and closets.

EXAMPLE 4

An absorbent slab made with asbestos and oriented cotton, in parallelepipedic form, having a surface of 150 cm.$^2$ and a weight of 10 g., is impregnated with 30 g. of the following homogeneous mixture:

| | G. |
|---|---|
| DDVP | 60 |
| Isostearic acid | 40 |

This slab exhibited powerful insecticidal power for about 2 months.

EXAMPLE 5

An absorbent slab, made of asbestos and oriented cotton, in parallelepipedic form, having a surface of 150 cm.$^2$ and a weight of 10 g., is impregnated with 30 g. of the following homogeneous mixture:

| | G. |
|---|---|
| DDVP | 70 |
| Isostearic acid | 30 |

This slab also exerted powerful insecticidal activity for about 2 months.

EXAMPLE 6

An absorbent felt weighing 12 g. and having a surface of 200 cm.$^2$, is impregnated with 60 g. of the following homogeneous mixture:

| | G. |
|---|---|
| DDVP | 40 |
| Isostearic acid | 40 |
| "Strobane" | 20 |

This slab exhibited excellent environmental and contact insecticidal activity for a period of about 3 to 4 months.

EXAMPLE 7

An absorbent slab made of asbestos and oriented cotton, in parallelepipedic form, having a surface of 50 cm.$^2$ and a weight of 3.5 g., is impregnated with 12 g. of the following homogeneous mixture:

| | G. |
|---|---|
| DDVP | 50 |
| Mineral oil sold under the tradename "Primol 342," by Esso, having a viscosity 1.8 poises, a density of 0.864 and B.P./10 mm. of 230–350° C. | 25 |
| Isostearic acid | 25 |

This slab, provided with a protective screen and closed on one of its faces by an adhesive vellum paper to promote slower evaporation, exhibited excellent moth insecticidal activity for cupboards and closets.

EXAMPLE 8

An absorbent slab made of asbestos and oriented cotton, in parallelepipedic form, having a surface of 150 cm.$^2$ and a weight of 10 g., is impregnated with 30 g. of the following homogeneous mixture:

| | G. |
|---|---|
| DDVP | 50 |
| Mineral oil sold under the tradename "250 T" by Esso having a viscosity of 0.4 poise, a density of 0.749 and B.P./760 mm. of 279–400° C. | 32 |
| Isostearic acid | 18 |

This slab exhibited powerful insecticidal activity for about 2 months.

EXAMPLE 9

An absorbent slab made of asbestos and unoriented cotton, in parallelepipedic form, having a surface of 150 cm.$^2$ and a weight of 10 g., is impregnated with 30 g. of the following homogeneous mixture:

| | G. |
|---|---|
| DDVP | 40 |
| Mineral oil sold under the tradename "Primol 342" sold by Esso having a viscosity of 1.8 poise, a density of 0.864 and a B.P./10 mm.=230–350° C. | 20 |
| Isostearic acid | 40 |

An identical slab is made by replacing the mineral oil "Primol 342" with a mineral oil sold under the tradename "Bayol 80," by Esso, and having a viscosity of 0.4 poise, and a density of 0.749.

EXAMPLE 10

An absorbent felt support weighing 12 g. and having a surface of 200 cm.$^2$, is impregnated with 60 g. of the following homogeneous mixture:

| | G. |
|---|---|
| DDVP | 35 |
| Mineral oil sold under the tradename "250 T," by Esso, having a viscosity of 0.4 poise, a density of 0.749 and a B.P./760 mm. of 279–400° C. | 40 |
| Isostearic acid | 25 |

An identical slab is made by replacing the mineral oil "250 T" by a mineral oil sold under the trade name "Marcol 80" by Esso, having an Engler viscosity of 4.3 at 20° C. and a density of 0.851 at 15° C.

EXAMPLE 11

An absorbent slab made of asbestos and oriented cotton, in parallelepipedic form, having a surface of 50 cm.$^2$ and a weight of 3.5 g., is impregnated with 12 g. of the following homogeneous mixture:

| | G. |
|---|---|
| DDVP | 70 |
| Mineral oil sold under the tradename "250 T," by Esso, having a viscosity of 0.4 poise, a density of 0.749 and a B.P./760 mm. of 279–400° C. | 10 |
| Isostearic acid | 20 |

This slab provided excellent insecticidal activity for a prolonged period of time.

What is claimed is:
1. Insecticidal composition consisting essentially of a homogeneous solution of dimethyl dichlorovinyl phosphate present in amounts ranging between 1–99% by weight of said composition and isostearic acid present in amounts effective to stabilize and to control the evaporation rate of said dimethyl dichlorovinyl phosphate.

2. The insecticidal composition of claim 1 wherein said dimethyl dichlorovinyl phosphate is present in amounts of about 30–70 percent by weight of said composition.

3. The insecticidal composition of claim 1 which also includes a mineral oil that is liquid at ambient temperature in amounts such that the homogeneity of the solution is preserved, said mineral oil being selected from the group consisting of
   (1) mineral oil having an initial distillation point of 279° C. under atmospheric pressure, a viscosity of 0.4 poise, a density of 0.749 and a B.P./760 mm. of 279–400° C.,
   (2) mineral oil having an initial distillation point of 230° C. under 10 mm. of mercury, a viscosity of 1.8 poise, a density of 0.864 and a B.P./10 mm. of 230–350° C., (3) mineral oil having an initial distillation point of 280° C. under 760 mm. Hg, a viscosity of 0.4 poise and a density of 0.749 and
(4) mineral oil having an initial distillation point of 160° C. under 6 mm. Hg, an Engler viscosity of 4.3 at 20° C. and an acid index below 1.

References Cited

UNITED STATES PATENTS

| | | | |
|---|---|---|---|
| 2,812,342 | 11/1957 | Peters | 260—409 |
| 3,116,201 | 12/1963 | Whetstone et al. | 424—219 |
| 3,127,235 | 3/1964 | Benzey | 21—60.5 |
| 3,295,246 | 1/1967 | Landsman et al. | 424—219 |
| 3,461,201 | 8/1969 | Champion | 424—219 |

OTHER REFERENCES

The Condensed Chemical Dictionary 7th Ed. received U.S. Patent Office 1967, p. 527.

Miles et al., J. Agricultural and Food Chem. vol. 10, No. 3, May–June 1962, pp. 240–244.

Polon et al., J. Agricultural and Food Chem. vol. 10, No. 3, May–June 1962, pp. 244–248.

ALBERT T. MEYERS, Primary Examiner

F. E. WADDELL, Assistant Examiner

U.S. Cl. X.R.

260—989; 424—19, 219